United States Patent
Kaneko et al.

(10) Patent No.: US 8,439,171 B2
(45) Date of Patent: May 14, 2013

(54) VEHICLE DISK BRAKE

(75) Inventors: Sinobu Kaneko, Nagano (JP); Hidekazu Ichikawa, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 419 days.

(21) Appl. No.: 12/749,798

(22) Filed: Mar. 30, 2010

(65) Prior Publication Data
US 2010/0243385 A1    Sep. 30, 2010

(30) Foreign Application Priority Data
Mar. 31, 2009 (JP) .................. 2009-085462

(51) Int. Cl.
*F16D 65/40* (2006.01)

(52) U.S. Cl.
USPC ...................... 188/73.38; 188/72.3

(58) Field of Classification Search .......... 188/72.3, 188/73.36, 73.37, 73.38
See application file for complete search history.

(56) References Cited

U.S. PATENT DOCUMENTS

| | | | | |
|---|---|---|---|---|
| 5,699,882 A | * | 12/1997 | Ikegami et al. | 188/73.38 |
| 7,219,773 B2 | * | 5/2007 | Ono | 188/73.38 |
| 7,513,340 B2 | * | 4/2009 | Hendrich et al. | 188/73.38 |

FOREIGN PATENT DOCUMENTS

| | | |
|---|---|---|
| JP | 57010539 | 1/1982 |
| JP | 03041232 | 2/1991 |
| JP | 07008640 | 1/1995 |
| JP | 3934063 | 6/2007 |

OTHER PUBLICATIONS

Japanese Office Action for corresponding Japanese Appl. No. 2009-085462, Drafting date Jan. 12, 2011, Dispatch date Jan. 18, 2011 (English translation).

* cited by examiner

*Primary Examiner* — Bradley King
*Assistant Examiner* — Nicholas J Lane
(74) *Attorney, Agent, or Firm* — Andrew M. Calderon; Roberts Mlotkowski Safran & Cole, P.C.

(57) ABSTRACT

A vehicle disc brake includes pad retainers. Each pad retainer includes: a pair of retainer portions; a connecting piece connecting the pair of retainer portions together; and pad returning portions. The retainer portion includes: an inner piece; an outer piece; and a deep side piece which is laid on the opposing surface so as to connect the outer piece and the inner piece together. The pad returning portion is formed by inclining a distal end portion of a narrow elongated piece while causing the distal end portion to warp into a curved shape. A dislodgement preventing projecting portion is formed through pressing on at least one of the outer piece and the inner piece so as to project towards an interior of a pad guide groove so that the lug piece can ride thereover when the lug piece is inserted into the pad guide groove.

17 Claims, 8 Drawing Sheets

VEHICLE DISK BRAKE

BACKGROUND

1. Field of the Invention

The present invention relates to a vehicle disc brake for use on vehicles such as motor vehicles and motorcycles and more particularly to a construction of a pad retainer for movably supporting lug pieces of a shoe of a friction pad by pad guide grooves on caliper supporting arms.

2. Description of the Related Art

In a disc brake in which lug pieces which are provided at both side portions of a shoe of a friction pad so as to project therefrom are movably supported in pad guide grooves which are formed so as to face each other in a pair of caliper supporting arms, so that the friction pad is supported movably in a disc axis direction, in general, a pad retainer which is formed of a thin metallic plate is interposed between the pad guide groove and the lug piece. Some of such pad retainers include an inner piece which is brought into abutment with a surface of the pad guide groove which lies inwards in a disc radial direction and a pad returning portion which is formed so as to connect to the inner piece not only for biasing a lug piece of the friction pad outwards in the disc radial direction but also for biasing the lug piece in a direction in which the lug piece moves away from the disc rotor. This pad returning portion is formed by forming an elastic loop portion by bending a proximal portion of a narrow elongated piece, which is provided to extend from a side of the inner piece which lies further from the disc rotor, from the outside in the disc radial direction in a direction in which the narrow elongated piece extends towards the disc rotor so as to be formed into an arc-like shape and inclining a distal end portion of the narrow elongated piece which extends from the elastic loop portion towards the disc rotor outwards in the disc radial direction. Then, even in the event that the lug piece of the friction pad is pressed in a dislodgement direction in which the lug piece moves away from the disc rotor when the friction pad is temporarily assembled to the caliper supporting arms, the elastic loop portion is brought into abutment with a side of the lug piece which lies further from the disc rotor, whereby the dislodgement of the friction pad from a caliper bracket is prevented (refer to Japanese Patent No. 3934063, for example).

In the disc brake referred to above, however, since the elastic loop portion is provided at the side of the pad guide groove which lies further from the disc rotor and so as to project outwards in the disc radial direction, when the friction pad is assembled, the friction pad has to be assembled so that the lug piece does not interfere with the elastic loop portion, whereby the assembling properties of the friction pad is deteriorated.

SUMMARY

An object of the invention is to provide a vehicle disc brake which can realize an improvement in assembling properties of a friction pad and which can prevent the dislodgement of the friction pad from a pad guide groove in an ensured fashion.

According to an aspect of the invention, there is provided a vehicle disc brake includes: a pair of caliper supporting arms, provided on a caliper bracket which is fixedly provided on a vehicle so as to extend over an outer edge of a disc rotor in a disc axis direction for supporting a caliper body; U-shaped pad guide grooves, provided in the caliper supporting arms so as to face each other, each U-shaped pad guide groove having an outer surface in a disc radial direction, an inner surface in the disc radial direction and an opposing surface which connects both the outer and inner surfaces together; lug pieces, provided at both side portions of a shoe of each of friction pads which are disposed to hold the disc rotor therebetween so as to extend therefrom; and pad retainers, wherein: the lug pieces are movably supported in the pad guide grooves via the pad retainers; each pad retainer includes: a pair of retainer portions which are laid out in the pad guide grooves lying on both sides of the disc rotor; a connecting piece extending over the outer edge of the disc rotor so as to connect the pair of retainer portions together; and pad returning portions for biasing the friction pads in a direction in which the friction pads move away from the disc rotor; the retainer portion includes: an inner piece which is brought into abutment with the inner surface in the disc radial direction; an outer piece which is laid on the outer surface in the disc radial direction; and a deep side piece which is laid on the opposing surface so as to connect the outer piece and the inner piece together; the pad returning portion is formed by inclining a distal end portion of a narrow elongated piece which extends from a side of the retainer portion which lies further from the disc rotor and which is then bent back to extend towards a side of the retainer portion which lies closer to the disc rotor towards the side which lies further from the disc rotor while causing the distal end portion to warp into a curved shape along a direction in which the narrow elongated piece extends; and a dislodgement preventing projecting portion is formed through pressing on at least one of the outer piece and the inner piece so as to project towards an interior of the pad guide groove, the dislodgement preventing projecting portion being formed so that the lug piece can ride thereover when the lug piece is inserted into the pad guide groove and so as to project towards a side of the lug piece which lies further from the disc rotor in a state that the lug piece is inserted into the pad guide groove.

In a case that the friction pad is assembled to the caliper supporting arm, the dislodgement preventing projecting portion may be formed, on an acting portion side of the caliper body, in a position where the dislodgement preventing projection portion can hold the corresponding lug piece so as to be further outboards than the disc rotor and further inboards than an open end portion of a cylinder bore formed the acting portion, while on a reacting portion side of the caliper body, the dislodgement preventing projecting portion may be formed in a position where the dislodgement preventing projecting portion can hold the corresponding lug piece so as to be further outboards than the disc rotor and further inwards than a surface of a side of a reaction force claw formed in the reacting portion which lies closer to the disc rotor.

The dislodgement preventing projecting portion may be formed on the outer piece. The inner piece may include a pad spring-back portion for biasing the lug piece outwards in the disc radial direction. Further, the inner piece may be formed with a side of a distal end portion thereof which lies closer to the disc rotor gradually inclined in a direction in which the friction pad is spaced away from a corresponding side surface of the disc rotor.

According to the vehicle disc brake of the invention, in assembling the friction pad, the lug pieces of the friction pad can be inserted easily into the pad guide grooves from the sides thereof which lie further from the disc rotor after the lug pieces have ridden over the corresponding dislodgement preventing projecting portions. Further, when the lug pieces are inserted into the pad guide grooves, the dislodgement preventing projecting portions project individually on the surfaces of the sides of lug pieces which lie further from the disc rotor. Because of this, the friction pad in the temporarily assembled state can be prevented from being dislodged, thereby making it possible to realize an improvement in assembling properties of the friction pad. In addition, the dislodgement preventing projecting portion can be constructed easily by implementing pressing work on at least one of the outer piece and the inner piece, there can be eliminated a fear that the production costs are increased.

In addition, the dislodgement preventing projecting portion is formed, on the acting portion side, in the position where the dislodgement preventing projection portion can hold the corresponding lug piece so as to be further outboards than the disc rotor and further inboards than the open end portion of the cylinder bore, while on the reacting portion side, the dislodgement preventing projecting portion is formed in the position where the dislodgement preventing projecting portion can hold the corresponding lug piece so as to be further outboards than the disc rotor and further inwards than the surface of the side of the reaction force claw which lies closer to the disc rotor. Because of this, the lug pieces can be held constantly in the predetermined positions within the retainer portions, thereby making it possible to realize an improvement in assembling properties of the friction pad.

Further, the dislodgement preventing projecting portion is formed on the outer piece, and the inner piece includes the pad spring-back portion for biasing the lug piece outwards in the disc radial direction. Because of this, the friction pad can be biased outwards in the disc radial direction, whereby not only can the dislodgement preventing projecting portions be brought into abutment with the lug pieces in an ensured fashion, but also the rattling of the friction pad can be suppressed when the brakes are applied. In addition, the inner piece is formed with the side of the distal end portion thereof which lies closer to the disc rotor gradually inclined in the direction in which the friction pad is spaced away from the corresponding side surface of the disc rotor. Because of this, the friction pad can also be spaced apart from the disc rotor at the inner piece.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
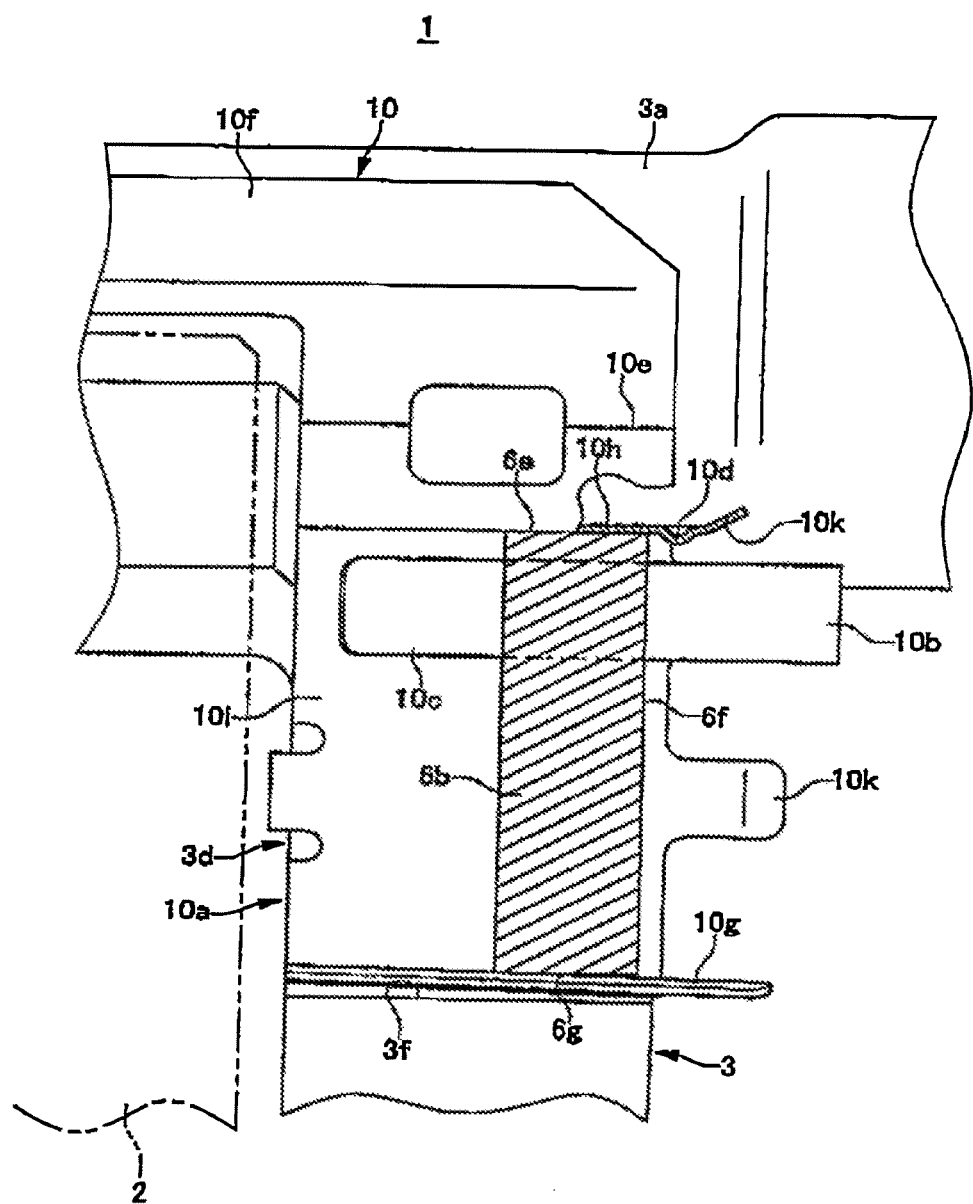
FIG. 1 is an enlarged sectional view of a main part of a vehicle disc brake according to an embodiment of the invention.
Figure 2:
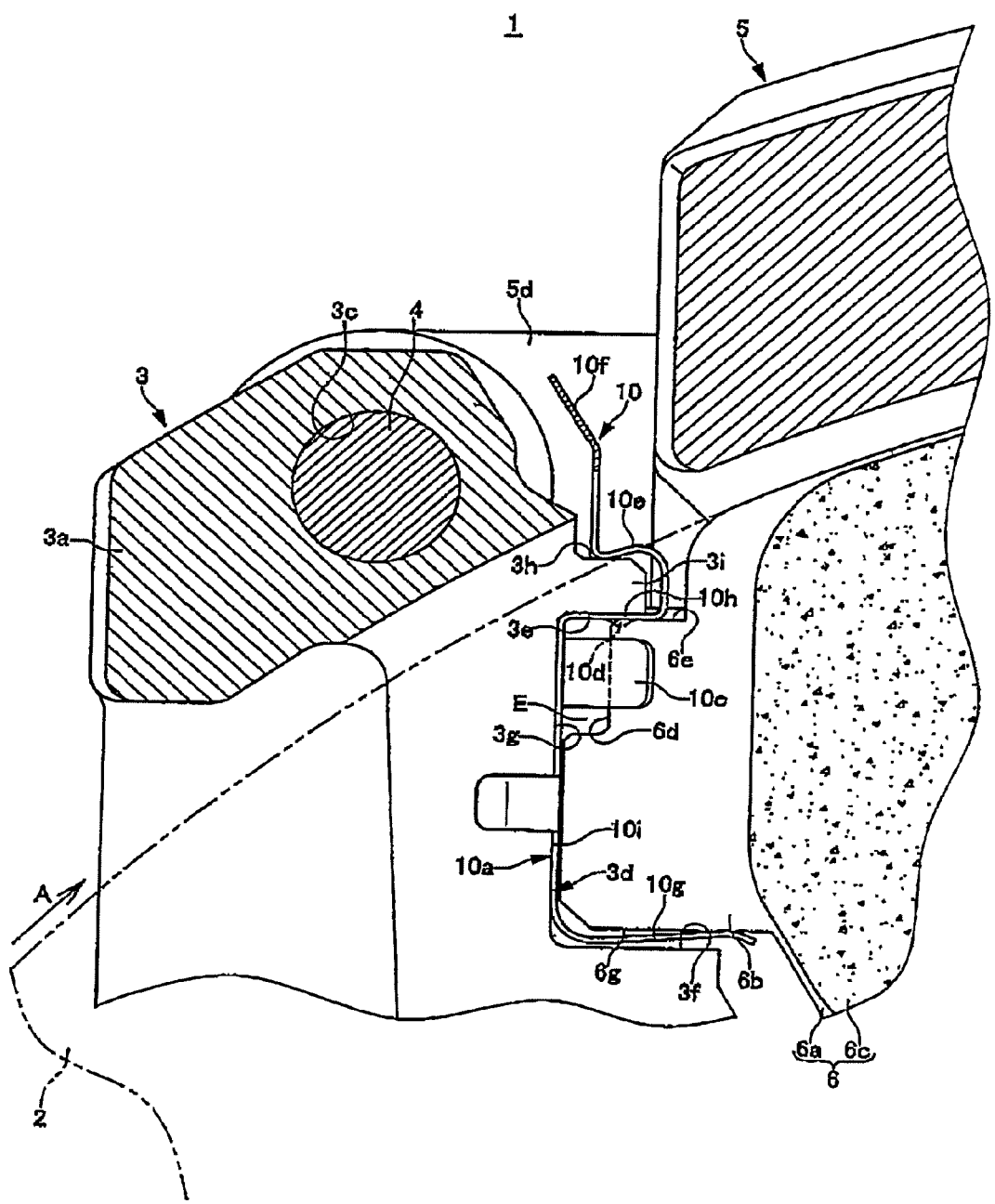
FIG. 2 is an enlarged sectional view of the main part of the vehicle disc brake according to the embodiment of the invention.
Figure 3:
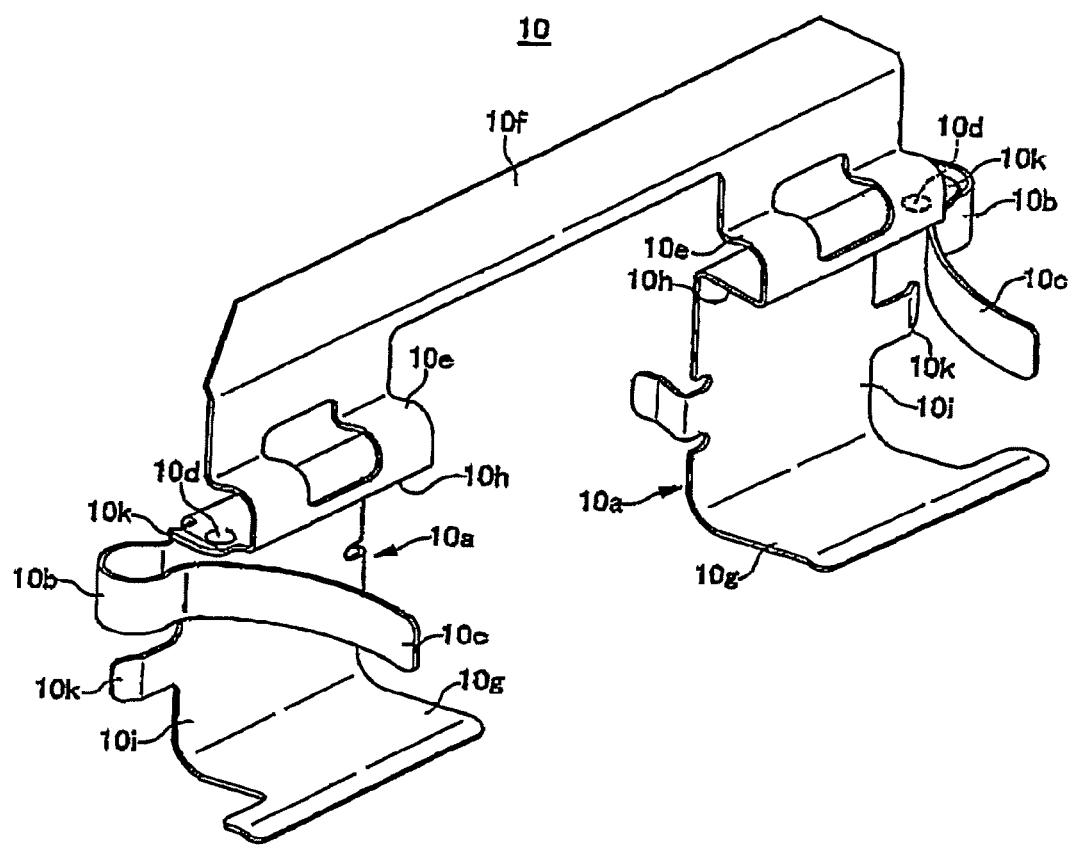
FIG. 3 is a perspective view of a pad retainer according to the embodiment of the invention.
Figure 4:
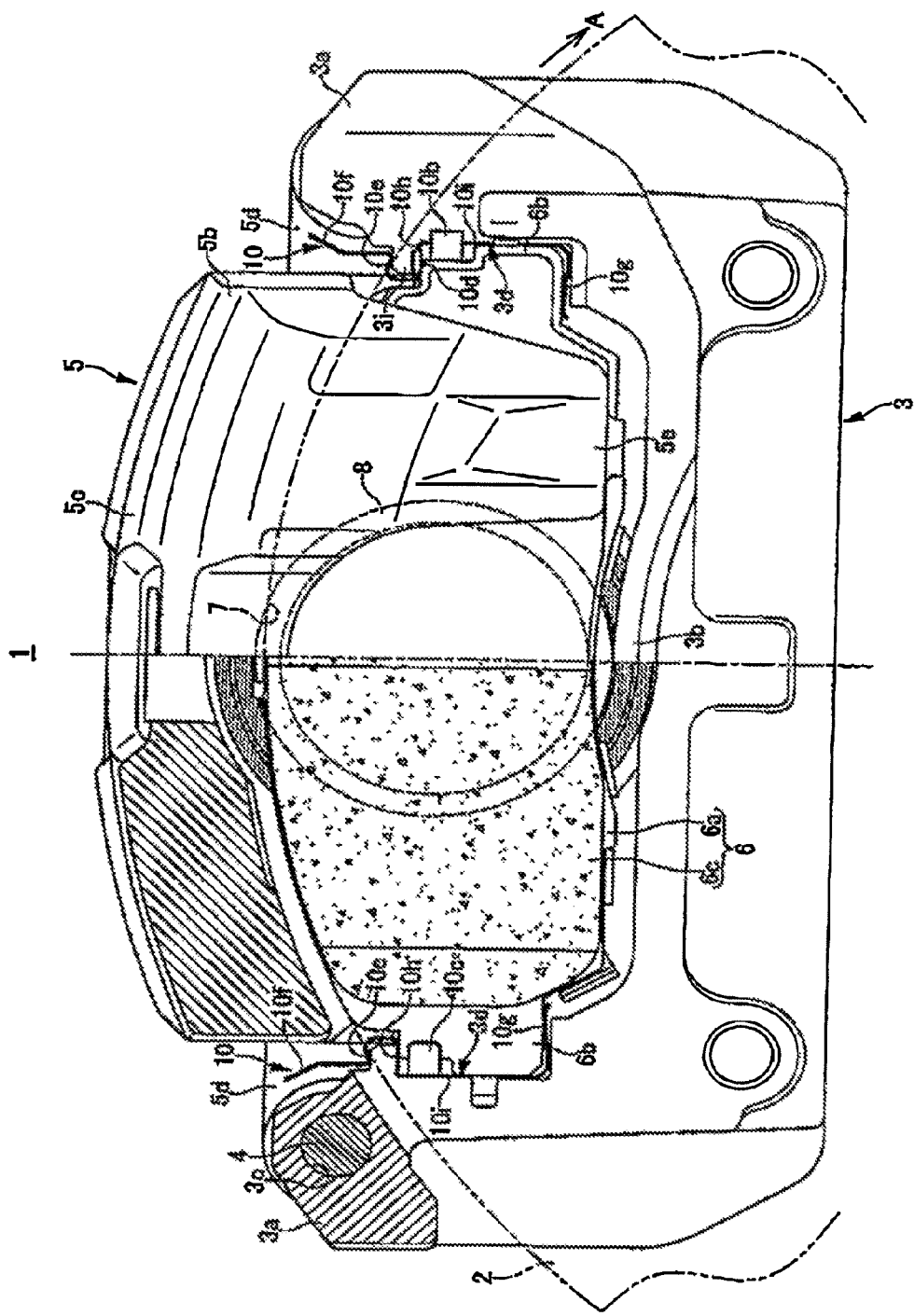
FIG. 4 is a partially sectional rear view of the vehicle disc brake according to the embodiment of the invention.
Figure 5:
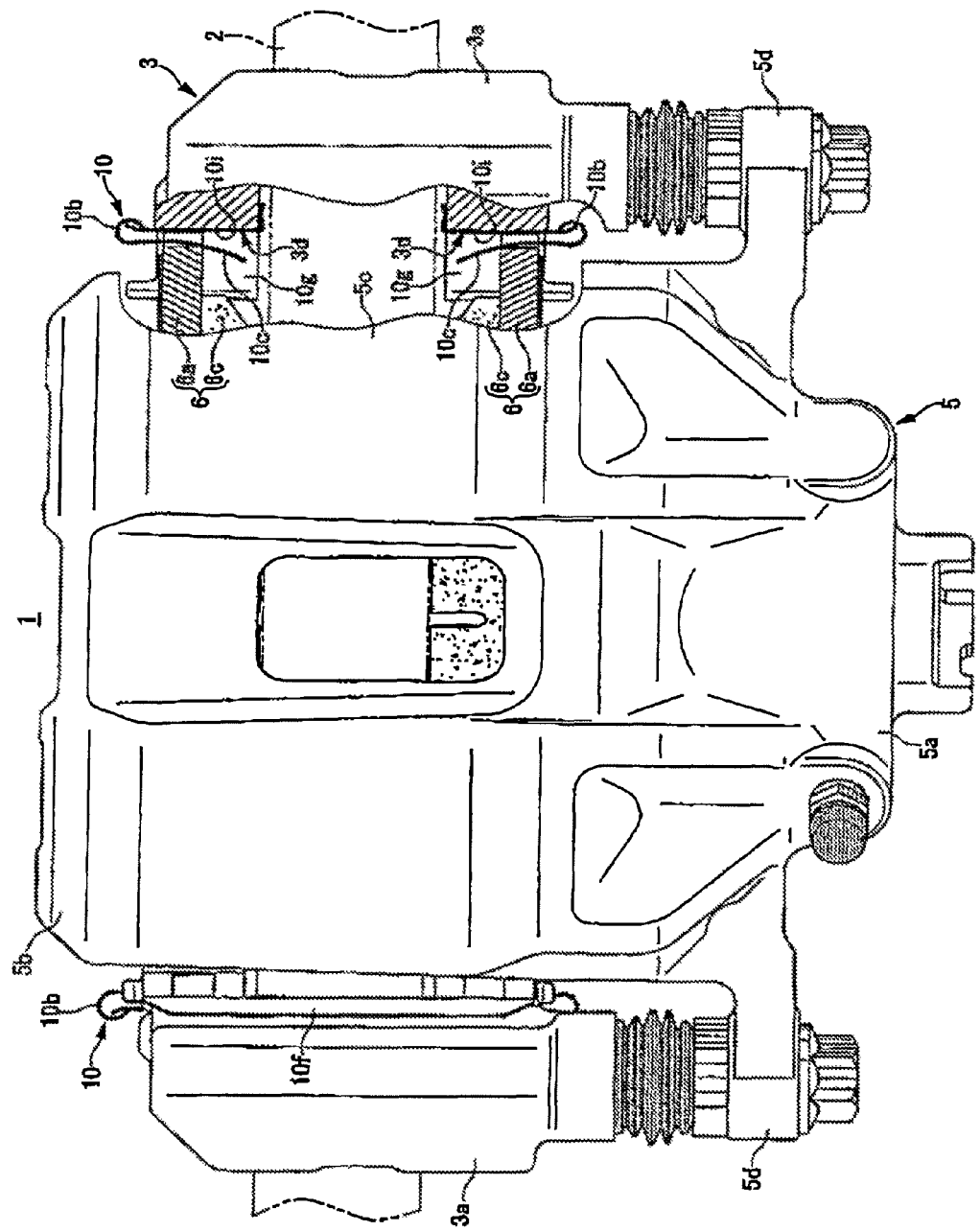
FIG. 5 is a partially sectional plan view of the vehicle disc brake according to the embodiment of the invention.
Figure 6:
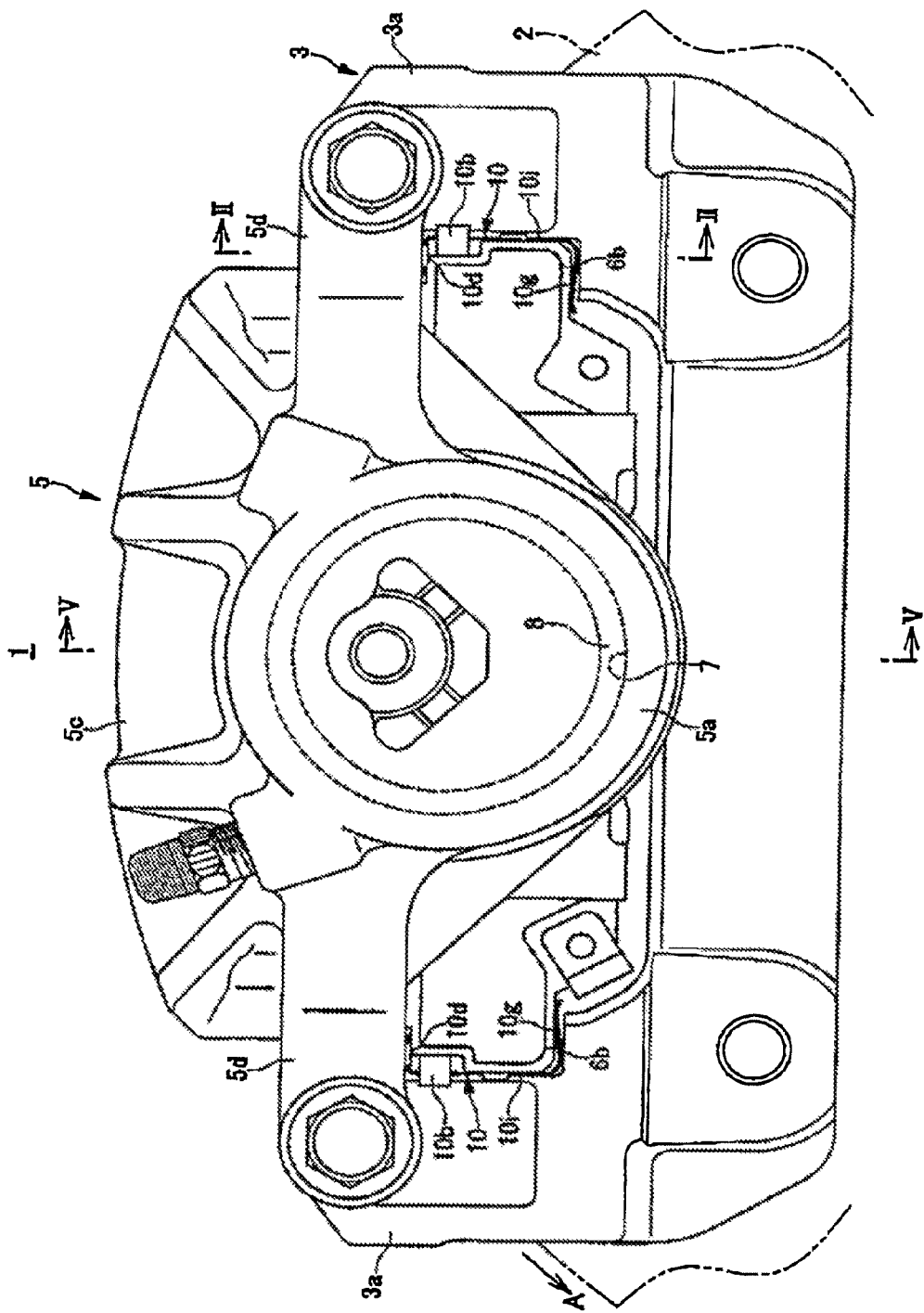
FIG. 6 is a front view of the vehicle disc brake according to the embodiment of the invention.

FIGS. 1 to 8 show an embodiment of a vehicle disc brake of the invention. An arrow A denotes a rotational direction of a disc rotor which rotates together with a front wheel when a vehicle travels forwards. When used in the following description, a disc rotation outlet side and a disc rotation inlet side are those resulting when the vehicle travels forwards.

This vehicle disc brake 1 is made up of a disc rotor which rotates together with a wheel and a caliper bracket 3 which is fixedly provided on a vehicle at one side portion of the disc rotor 2, a caliper body 5 which is supported movably in a disc axis direction via a pair of slide pins 4, 4 on caliper supporting arms 3a, 3a of the caliper bracket 3, and a pair of friction pads 6, 6 which are disposed to face each other across the disc rotor 2 on inner sides of an acting portion 5a and a reacting portion 5b of the caliper body 5.

The caliper body 5 is made up of the acting portion 5a and the reacting portion 5b which are disposed on both sides of the disc rotor 2 and a bridge portion 5c which extends over an outer edge of the disc rotor 2 to connect the acting and reacting portions together. A cylinder bore 7 is provided in the acting portion 5a, and a side of the cylinder bore 7 which faces the disc rotor 2 is opened. A bottomed cylindrical piston 8 is accommodated in the cylinder bore 7. The piston 8 is adapted to move in the direction of the disc rotor in the cylinder bore 7 by means of a hydraulic fluid which is supplied to a hydraulic chamber 9 at a bottom portion of the cylinder bore 7. In addition, body mounting arms 5d, 5d are provided at a side portion of the acting portion 5a so as to project therefrom, and the slide pin 4 is provided at a distal end of each body mounting arm 5d so as to project therefrom by a mounting bolt.

The caliper supporting arms 3a, 3a have a shape in which they are erected from both side portions of the caliper bracket 3 while holding both sides of the bridge portion 5c, extend over the outer edge of the disc rotor 2 in a disc axis direction, and extend towards a disc center direction along a side wall of the reacting portion 5b on the other side portion of the disc rotor 2. Distal end portions of the caliper supporting arms 3a, 3a are connected by a tie rod 3b so as to increase the rigidity of both the supporting arms 3a, 3a to which braking torque is applied.

A guide hole 3c is bored in each caliper arm 3a for accommodation of the slide pin 4, and four pad guide grooves 3d are provided in both the caliper supporting arms 3a, 3a so as to face each other at the respective side portions of the disc rotor 2. Each pad guide groove 3d is formed into a W-shape having an outer surface 3e which lies outwards in the disc radial direction, an inner surface 3f which lies inwards in the disc radial direction and an opposing surface 3g which connects both the outer and inner surfaces 3e, 3f together. In addition, pad retainer mounting portions 3i, 3i are provided on outer sides of the pad guide grooves 3d, 3d in the disc radial direction, and the pad retainer mounting portions 3i, 3i each have a mounting surface 3h which is parallel to the outer surface 3e in the disc radial direction.

Each friction pad 6 has lug pieces 6b, 6b which are provided at both side portions of a shoe 6a so as to project therefrom, and a lining 6c is affixed to one side surface of the shoe 6a. Outer surfaces 6d, 6d in a disc rotating direction of the lug pieces 6b, 6b are each formed into a stepped shape in which a projecting length on an outer side in the disc radial direction is shorter than a projecting length on an inner side in the disc radial direction. The lug pieces 6b, 6b are supported movably in the pad guide grooves 3d, 3d at disc rotation inlet and disc rotation outlet sides via corresponding pad retainers 10.

The pad retainer 10 is made up of a pair of retainer portions 10a, 10a which are adapted to be mounted in the pad guide grooves 3d, 3d lying on both the sides of the disc rotor at the disc rotation inlet or disc rotation outlet side, pad returning portions 10c, 10c which extend towards the disc rotor via elastic loop portions 10b, 10b which are provided at respective sides of the retainer portions 10a, 10a which lie further from the disc rotor, dislodgement preventing projecting portions 10d, 10d which project inwards of the corresponding pad guide grooves from side portions of the retainer portions 10a, 10a which lie further from the disc rotor, mounting pieces 10e, 10e which are brought into abutment with the mounting surfaces 3h of the pad retainer portions 3i, 3i of the caliper supporting arm 3a, and a connecting piece 10f which connects upper portions of the mounting pieces 10e, 10e together.

Each retainer portion 10a is made up of an inner piece 10g and an outer piece 10h which are disposed inwards and outwards in the disc radial direction, respectively, so as to face each other while holding the lug piece 6b of the friction pad 6a therebetween and a deep side piece 10i which connects both the pieces 10g, 10h at a deep portion in each of the pad guide grooves 3d, 3d. Each inner piece 10g is formed so as to be inclined gradually outwards in the disc radial direction on a distal end side thereof and is also formed so as to be inclined gradually in a direction in which the friction pad 6 is spaced apart from a side surface of the disc rotor 2 at a side of a distal end portion which faces the disc rotor. Thus, each inner piece 10g is constructed to bias the lug piece 6b outwards in the disc radial direction and towards the side which lies further from the disc rotor.

Each elastic loop portion 10b is formed by bending a narrow elongated piece which extends from an outer side in the disc radial direction of the deep side piece 10i in a direction in which it extends away from the disc rotor back in a direction in which it extends towards the disc rotor so as to be formed into an arc-like shape. The pad returning portion 10c is formed by inclining a distal end portion of the narrow elongated piece which extends further from a bent-back end of the elastic loop portion 10b in the direction in which the narrow elongated piece extends towards the disc rotor in a direction in which the narrow elongated piece extends away from the deep side piece 10i and then warping the distal end portion so inclined into a curved shape. This pad returning portion 10c has a sufficient length for a distance over which the lug piece 6b of the friction pad 6 moves from the time when the lining 6c is fresh to the time when the lining 6c wears out.

A distal end portion of each outer piece 10h is bent back along a distal end face of the pad retainer mounting portion 3i so as to extend towards an outer surface in the disc radial direction of the pad retainer mounting portion 3i so that the mounting piece 10e is formed so as to be elastically deformable, whereby the pad retainer mounting portion 3i is held by the mounting piece 10e which is now elastically deformed outwards and the outer piece 10h therebetween. In addition, the dislodgement preventing projecting portion 10d is formed through pressing at a side of the outer piece 10h which lies further from the disc rotor so as to project inwards in the disc radial direction to be inside the pad guide groove. Further, an insertion guide piece 10k is formed at the side of each retainer portion 10a which lies further from the disc rotor so as to be opened outwards to thereby facilitate the insertion of the lug piece 6b of the friction pad 6.

Figure 7:
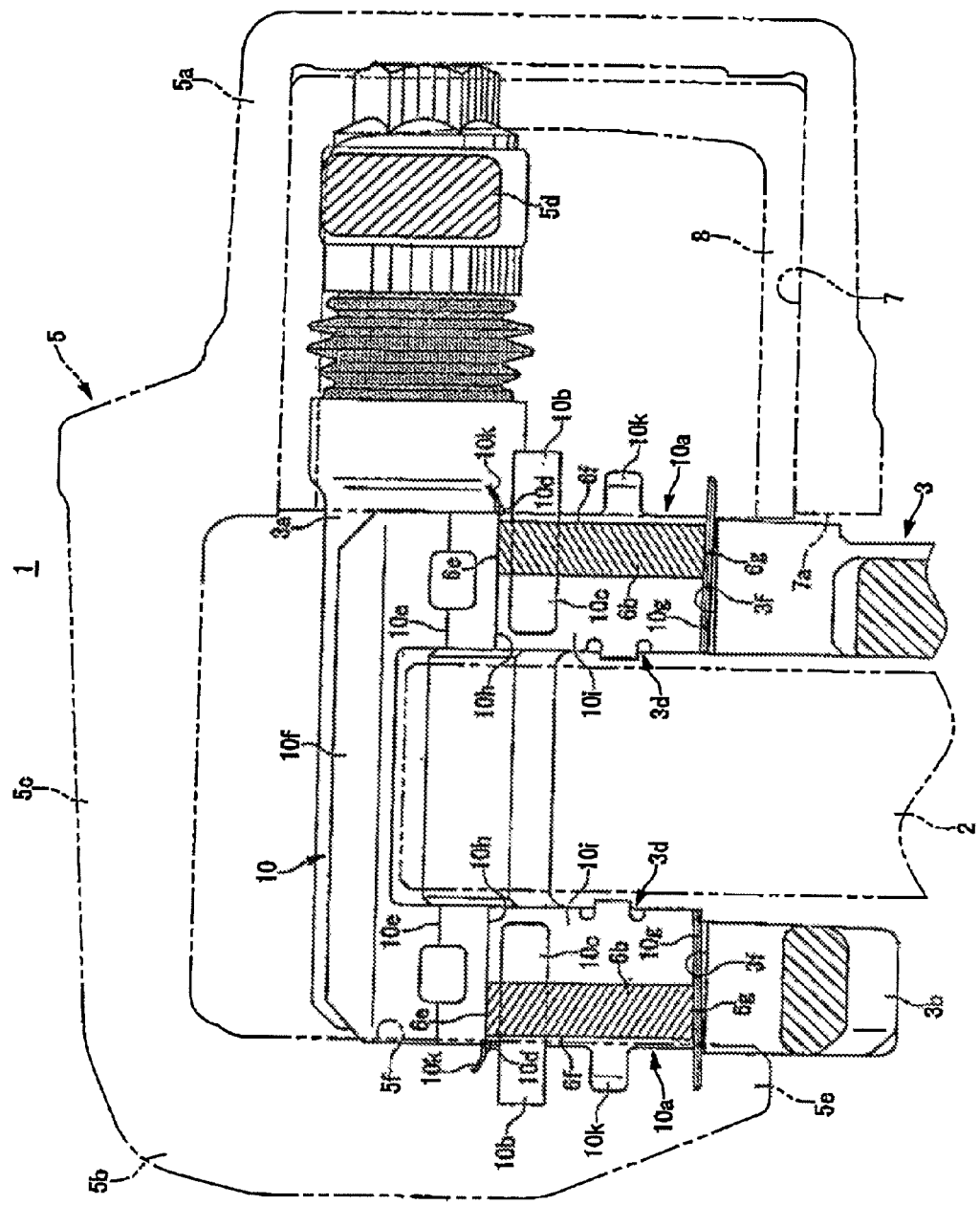
FIG. 7 is a sectional view taken along the line II-II in FIG. 6.
Figure 8:
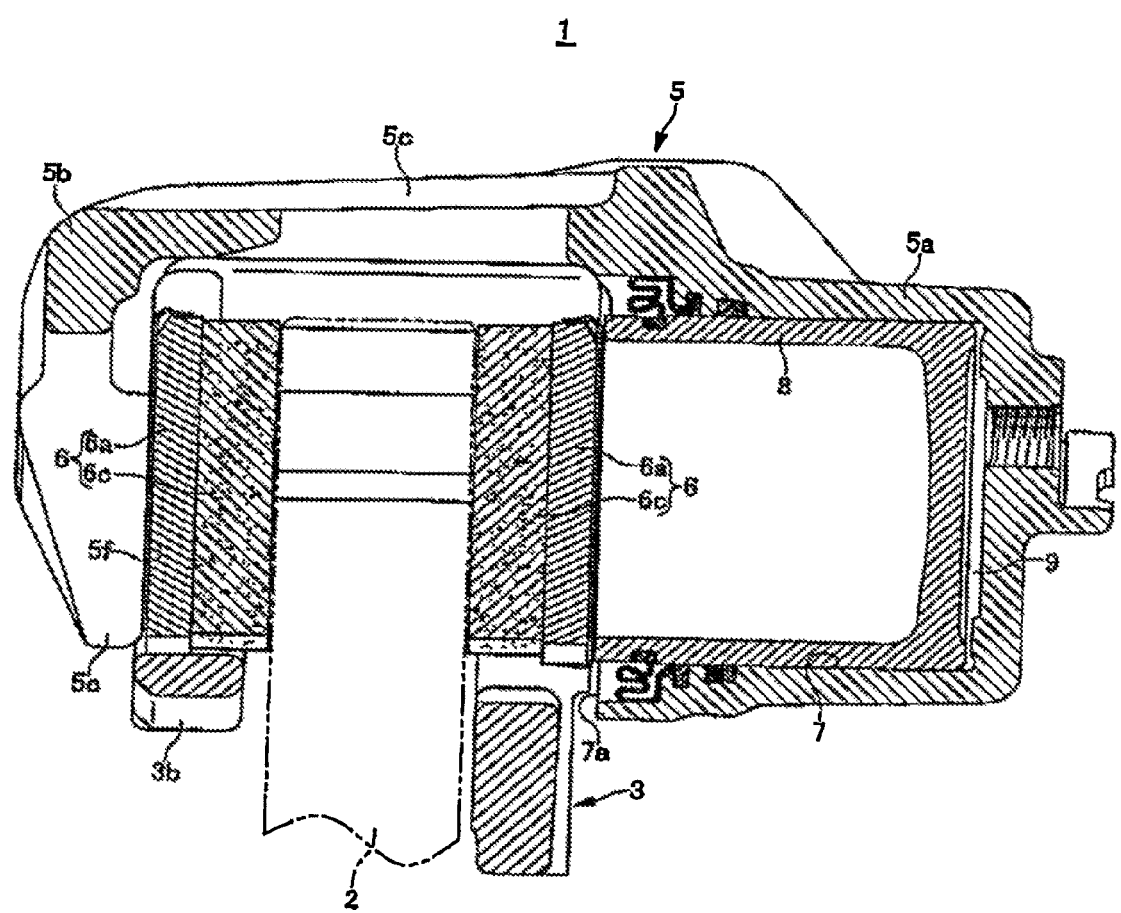
FIG. 8 is a sectional view taken along the line V-V in FIG. 6.

As is shown in FIG. 7, in such a state that the respective friction pads 6 are assembled to the caliper supporting arms 3a, the dislodgement preventing projecting portion 10d on the acting portion 5a side of the caliper body 5 is formed in a position where the lug piece 6b can be held further outboards than the disc rotor 2 and further inboards than an open end portion 7a of the cylinder bore 7, while the dislodgement preventing projecting portion 10d on the reacting portion 5b side of the caliper body 5 is formed in a position where the lug piece 6b can be held further outboards than the disc rotor 2 and further inboards than a surface 5f on a side of a reaction force claw 5e which lies closer to the disc rotor. In this embodiment, the dislodgement preventing projecting portion 10d is formed on the same plane as an end face of the side of the retainer portion 10 which lies further from the disc rotor. Then, in inserting the lug piece 6b into the pad guide groove 3d, with an outer surface 6e in the disc radial direction of the lug piece 6b pressing the dislodgement preventing projecting portion 10d against the outer surface 3e in the disc radial direction of the pad guide groove 3d, the lug piece 6b rides over the dislodgement preventing projecting portion 10d to thereby be inserted into the pad guide groove 3d. In addition, the dislodgement preventing projecting portion 10d is formed so as to project on a side of the lug piece 6b which lies further from the disc rotor in such a state that the lug piece 6b has been inserted into the pad guide groove 3d.

The pad retainer 10 that is formed in the way described heretofore is mounted on the caliper supporting arm 3a with the pad retainer portion 3i held by the mounting pieces 10e, 10e and the outer pieces 10h, 10h therebetween and is attached thereto with the inner piece 10g and the outer piece 10h of each retainer portion 10a kept in abutment with the inner surface 3f in the disc radial direction and the outer surface 3e in the disc radial direction of each pad guide groove 3d, respectively, and the deep side piece 10i is laid out so as to extend along the opposing surface 3g. By the pad retainer 10 being mounted in the way described above, the dislodgement preventing projecting portion 10d is disposed at the side of each pad guide groove 3d which lies further from the disc rotor.

When the lug pieces 6b, 6b of the shoe 6a of each friction pad 6 are inserted into the pad guide grooves 3d, 3d from the sides thereof which lie further from the disc rotor at the disc rotation inlet and disc rotation outlet sides, the outer surfaces 6e in the disc radial direction of the lug pieces 6b, 6b press the dislodgement preventing projecting portions 10d, 10d against the outer surfaces 3e, 3e in the disc radial direction of the pad guide grooves 3d, 3d and then ride over the dislodgement preventing projecting portions 10d to thereby be inserted into the corresponding pad guide grooves 3d, 3d, respectively. When the lug pieces 6b, 6b are inserted into a predetermined position in the pad guide grooves 3d, 3d, the dislodgement preventing projecting portions 10d, 10d are disposed on sides of the lug pieces 6b, 6b which lie further from the disc rotor. When the lug pieces 6, 6b are inserted into the pad guide grooves 3d, 3d, respectively, at the disc rotation inlet and disc rotation outlet sides in the way described above, the lug pieces 6b, 6b are biased towards the side which lies further from the disc rotor by elastically deforming the elastic loop portions 10b, 10b and the pad returning portions 10c, 10c. However, the dislodgement preventing projecting portion 10h which projects inwards in the disc radial direction from the outer piece 10h is brought into abutment with a side surface 6f of the lug piece 6b which lies further from the disc rotor so as to restrict the lug piece 6b from moving from the position where it is temporarily assembled towards the side lying further from the disc rotor, thereby making it possible to prevent the friction pad 6 in the temporarily assembled state from being dislodged from the pad guide groove 3d. Further, by biasing the lug piece 6b outwards in the disc radial direction by the inner piece 10g which is inclined gradually outwards in the disc radial direction at the distal end side, the dislodgement preventing projection portion 10d and the side surface 6f of the lug piece 6b which lies further from the disc rotor can be brought into abutment with each other in a more ensured fashion. In addition, since the dislodgement preventing projecting portion 10*d* is formed into a simple construction by implementing pressing work on the outer piece 10*h*, the friction pad 6 in the temporarily assembled state can be prevented from being dislodged from the caliper supporting arm 3*a*.

On the other hand, in such a state that the lug piece 6*b* has been inserted into the pad guide groove 3*d* in the way described above, an outer portion in the disc radial direction of the outer surface 6*d* in the disc rotating direction is in abutment with the pad returning portion 10*c*, whereby the pad returning portion 10 is pressed towards the deep side piece 10*i*. In addition, a space portion E is defined between an outer side in the disc radial direction of the outer surface 6*d* in the disc rotating direction of the lug piece 6*b* and the deep side piece 10*i*. Further, an inner surface 6*g* in the disc radial direction of the lug piece 6*b* presses the inner piece 10*g* towards the inner surface 3*f* in the disc radial direction of the pad guide groove 3*d*.

In the embodiment that is configured as has been described heretofore, when the hydraulic fluid whose pressure is increased is supplied into the hydraulic chamber 9 by a braking operation performed by the driver, the piston 8 travels forwards in the cylinder bore 7, whereby the friction pad 6 on the acting portion 5*a* side is pressed against one side surface of the disc rotor 2 which is rotating in the direction indicated by the arrow A. Next, the caliper body 5 is caused to move in the direction of the acting portion 5*a* while being guided by the slide pins 4, 4 by virtue of a reaction force produced as a result of the friction pad 6 being pressed against the rotating disc rotor 2, whereby the reaction force claw 5*e* presses the friction pad 6 on the reacting portion 5*b* side against the other side surface of the disc rotor 2.

As this occurs, the lug pieces 6*b*, 6*b* of each friction pad 6*b* move smoothly within the pad guide grooves 3*d*, 3*d* while the outer surfaces 6*e* in the disc radial direction are guided by the outer pieces 10*h*, 10*h* of the retainer portions 10*a*, 10*a* and the inner surfaces 6*g* in the disc radial direction of the lug pieces 6*b*, 6*b* press the inner pieces 10*g*, 10*g* towards the inner surface 3*f* in the disc radial direction. Although the inner pieces 10*g*, 10*g* are pressed towards the inner surface 3 in the disc radial direction by the lug pieces 6*b*, 6*b*, the inner pieces 10*g*, 10*g* press the outer surfaces 6*e* in the disc radial direction of the lug pieces 6*b*, 6*b* towards the outer surfaces 3*e*, 3*e* in the disc radial direction of the pad guide grooves 3*d*, 3*d* and press the lug pieces 6*b*, 6*b* towards the side which lies further from the disc rotor by virtue of the spring-back force of the inner pieces 10*g*, 10*g*.

Since this causes the outer surfaces 6*e*, 6*e* in the disc radial direction of the lug pieces 6*b*, 6*b* to be pressed against the outer surfaces 3*e*, 3*e* in the disc radial direction of the pad guide grooves 3*d*, 3*d* at all times, there occurs no such situation that the lug pieces 6*b*, 6*b* rattle within the pad guide grooves 3*d*, 3*d* when the brakes are applied, there by making it possible to effectively realize the suppression of striking noise produced by the respective friction pads 6 due to looseness, as well as brake noise.

On the other hand, when the braking operation is stopped, the piston 8 and the reaction force claw 5*e* retreating to their original positions resulting before the brakes are applied, since the elastic loop portions 10*b*, 10*b* and the pad returning portions 10*c*, 10*c* attempt to restore their initial shapes, the lug pieces 6*b*, 6*b* which are in abutment with the pad returning portions 10*c*, 10*c* are pressed towards the side lying further from the disc rotor and each friction pad 6 is forced to be spaced apart from the corresponding side surface of the disc rotor 2. In addition, each lug piece 6*b* is biased towards the side lying further from the disc rotor by the inner piece 10*g*.

By doing so, the dragging of each friction pad 6 is prevented, thereby making it possible to effectively realize the suppression of brake judder produced as a result of wear of the disc rotor 2, as well as brake noise.

In addition, when the lining 6*c* of the friction pad 6 wears down, the friction pad 6 gradually moves towards the disc rotor 2 side and the lug pieces 6*b*, 6*b* are brought into abutment with distal end sides of the pad returning portions 10*c*, 10*c*. Because of this, although the spring-back force from the elastic loop portions 10*b*, 10*b* is reduced, since the pad returning portions 10*c*, 10*c* are formed so as to warp into the curved shape along the direction in which they extend, the spring-back force so reduced can be compensated for by the pad returning portions 10*c*, 10*c*, whereby irrespective of the lining 6*c* so wearing down, the friction pad 6 can be spaced apart from the corresponding side surface of the disc rotor 2 in an ensured fashion, thereby making it possible to suppress the rattling of the friction pad 6.

Further, a space where the pad returning portions 10*c*, 10*c* operate is ensued by the space portion E being defined between the outer side in the disc radial direction of the outer surface 6*d* in the disc rotating direction of the lug piece 6*b* and the deep side piece 10*i*, whereby the pad returning portion 10*c*, 10*c* are allowed to operate well. In addition, by adopting this construction, when the brakes are applied, the outer side in the disc radial direction of each lug piece 6*b* is not brought into abutment with the opposing surface 3*g* of the pad guide groove 3*d* but only the inner side in the disc radial direction of each lug piece 6*b* is brought into abutment with the opposing surface 3*g* of the pad guide groove 3*d* for transmission of braking torque. Because of this, in performing a braking operation involving a small load, the floating of the friction pad at the disc rotation inlet side can be suppressed, thereby making it possible to suppress the generation of brake noise.

Note that the invention is not limited to the embodiment that has been described heretofore. For example, an inner piece of a pad retainer may be formed into a planar shape which extends along an inner surface in a disc radial direction of a pad guide groove, and a dislodgement preventing projecting portion can be provided on each of the inner piece and an outer piece. In addition, the pad returning portion does not necessarily have to be provided so as to connect to the deep side piece. There may be provided a pad returning portion which is provided so as to connect to an inner piece of a pad retainer. As this occurs, a dislodgement preventing projecting portion may be provided only on an outer piece of the pad retainer. Further, the shapes of the connecting piece and the mounting piece of the pad retainer are arbitrary, and the shape of the insertion guide piece of the pad retainer and the location where to form the piece are also arbitrary. In addition, in the embodiment described above, while the end face in the disc rotating direction of the lug piece is formed into the stepped shape so as to ensure the space portion where the pad returning portion can operate, the invention is not limited thereto. The end face in the rotating direction of the lug piece may be formed into a planar shape, while an opposing surface of the pad guide groove is formed into a stepped shape and the deep side piece of the pad retainer is also formed into a stepped shape so as to follow the opposing surface of the deep side piece, so as to ensure the space portion.

What is claimed is:
1. A vehicle disc brake comprising:
   a pair of caliper supporting arms provided on a caliper bracket which is fixedly provided on a vehicle, the pair of caliper supporting arms extending over an outer edge of a disc rotor in a disc axis direction to support a caliper body;

U-shaped pad guide grooves provided in the caliper supporting arms so as to face each other, each U-shaped pad guide groove having
an outer surface in a disc radial direction,
an inner surface in the disc radial direction, and
an opposing surface which connects both the outer and inner surfaces together;
lug pieces provided at both side portions of a shoe of each of friction pads which are disposed across the disc rotor, the lug pieces protruding from the both side portions of the shoe of each friction pad; and
pad retainers, wherein
the lug pieces are movably supported in the pad guide grooves via the pad retainers,
each pad retainer includes
a pair of retainer portions which are laid out in the pad guide grooves lying on both sides of the disc rotor,
a connecting piece extending over the outer edge of the disc rotor so as to connect the pair of retainer portions together, and
pad returning portions for biasing the friction pads in a direction in which the friction pads move away from the disc rotor,
each retainer portion includes
an inner piece which is brought into abutment with the inner surface of the corresponding pad guide groove,
an outer piece which is laid on the outer surface of the corresponding pad guide groove, and
a deep side piece which is laid on the opposing surface of the corresponding pad guide groove so as to connect the outer piece and the inner piece together;
each pad returning portion is formed
by inclining a distal end portion of a narrow elongated piece, which extends with being bent back from a side of the corresponding retainer portion opposite to the disc rotor towards a disc rotor direction, towards a direction opposite to the disc rotor direction, and
by causing the distal end portion to warp into a curved shape along a direction in which the narrow elongated piece extends,
a dislodgement preventing projecting portion is formed through pressing on at least the outer piece of each retainer portion so as to project towards an interior of the corresponding pad guide groove, each dislodgement preventing projecting portion being formed so that the corresponding lug piece can ride thereover when the corresponding lug piece is inserted into the corresponding pad guide groove, each dislodgement preventing projection portion projecting towards an opposite side of the corresponding lug piece to the disc rotor in a state that the corresponding lug piece is inserted into the corresponding pad guide groove, and
in a state where the friction pads are assembled to the caliper supporting arms,
the dislodgement preventing projecting portions on an acting portion side of the caliper body are formed in positions where the dislodgement preventing projection portions can hold the corresponding lug pieces, the positions being on an outer side of the disc rotor and on an inner side of an open end portion of a cylinder bore formed in the acting portion, and
the dislodgement preventing projecting portions on a reacting portion side of the caliper body are formed in positions where the dislodgement preventing projecting portions can hold the corresponding lug pieces, the positions being on an outer side of the disc rotor and on an inner side of a disc-rotor-side surface of a reaction force claw formed in the reacting portion, and
wherein each inner piece is formed so as to be inclined gradually outwards in the disc radial direction on a distal end side thereof and is also formed so as to be inclined gradually in a direction in which the friction pad is spaced apart from a side surface of the disc rotor at a side of the distal end portion which faces the disc rotor.

2. The vehicle disc brake according to claim 1, wherein
each dislodgement preventing projecting portion is formed on the outer piece of the corresponding retainer portion, and
each inner piece includes a pad spring-back portion for biasing the corresponding lug piece outwards in the disc radial direction.

3. The vehicle disc brake according to claim 1, wherein a distal end portion of each inner piece is gradually inclined from one end thereof on the side of the disc rotor to the other end thereof on the opposite side to the disc rotor so that the corresponding friction pad is spaced away from a side surface of the disc rotor.

4. The vehicle disc brake according to claim 1, wherein
the narrow elongated piece includes an elastic loop portion, and
each dislodgement preventing projecting portion is formed on the outer piece adjacent to the elastic loop portion of the corresponding retainer portion.

5. The vehicle disc brake according to claim 1, further comprising insertion guide pieces each formed at a side of the corresponding retainer portion so as to be opened outwards.

6. The vehicle disc brake according to claim 5, wherein each dislodgement preventing projecting portion is formed adjacent to the corresponding insertion guide piece.

7. The vehicle disc brake according to claim 1, wherein each dislodgement preventing projecting portion faces the inner piece of the corresponding retainer portion.

8. The vehicle disc brake according to claim 1, wherein each inner piece biases the corresponding lug piece outwards in the disc radial direction and towards the opposite side to the disc rotor.

9. The vehicle disc brake according to claim 1, wherein comprising insertion guide pieces each extending from an opposite side of the deep side piece of the retainer portion to the disc rotor so as to be opened outwards.

10. The vehicle disc brake according to claim 9, wherein each insertion guide piece is positioned below the corresponding pad returning portion.

11. A vehicle disc brake comprising:
pad retainers, each pad retainer including
a pair of retainer portions, each of which having
an inner piece in a disc radial direction,
an outer piece in the disc radial direction, and
a deep side piece which connects the outer piece and the inner piece together and forms an interior groove section for accommodating a lug piece of a friction pad and which fits within a pad guide groove formed in a supporting arm of a caliper body;
pad returning portions each including an elastic loop portion and a curved shape portion;
dislodgement preventing projecting portions each formed through pressing on the outer piece of the corresponding retainer portion so as to project towards the corresponding interior groove section, and a distal end portion of each inner piece is gradually inclined with respect to the outer piece from one end thereof on a side of a disc rotor to the other end thereof on an opposite side to the disc rotor so that the corresponding friction pad is spaced away from a side surface of the disc rotor.

12. The vehicle disc brake according to claim 11, wherein each dislodgement preventing projection portion is formed on the corresponding outer piece adjacent to the corresponding elastic loop portion.

13. The vehicle disc brake according to claim 12, wherein further comprising insertion guide pieces each formed at a side of the corresponding retainer portion which lies so as to be opened outwards to thereby facilitate insertion of the corresponding lug piece of the friction pad.

14. The vehicle disc brake according to claim 13, wherein each dislodgement preventing projection portion is formed adjacent to the corresponding insertion guide piece.

15. The vehicle disc brake according to claim 14, wherein each dislodgement preventing projecting portion is formed on the outer piece of the corresponding retainer portion and faces the inner piece of the corresponding retainer portion.

16. The vehicle disc brake according to claim 15, wherein each inner piece is formed so as to be inclined gradually outwards in a disc radial direction.

17. The vehicle disc brake according to claim 16, wherein each inner piece biases the corresponding lug piece outwards in the disc radial direction and towards the opposite side to the disc rotor.

* * * * *